(No Model.)

J. M. LOWREY.
SEED PLANTER.

No. 303,533. Patented Aug. 12, 1884.

WITNESSES
Edwin L. Yewell
J. J. McCarthy

INVENTOR
John M. Lowrey,
By C. M. Alexander
Attorney

UNITED STATES PATENT OFFICE.

JOHN M. LOWREY, OF PERDUE HILL, ALABAMA.

SEED-PLANTER.

SPECIFICATION forming part of Letters Patent No. 303,533, dated August 12, 1884.

Application filed February 28, 1884. (No model.)

*To all whom it may concern:*

Be it known that I, JOHN M. LOWREY, a citizen of the United States, residing at Perdue Hill, in the county of Monroe and State of Alabama, have invented certain new and useful Improvements in Seed-Planters, of which the following is a specification, reference being had therein to the accompanying drawings.

My invention relates to seed-planters. In this planter I employ an endless seeding-belt, which passes through the hopper of the machine and receives and delivers the grain; and with said belt I employ a device for regulating the tension of same, and a spring cut-off, as also mechanism for operating the stirring device, all of which will be hereinafter more particularly described.

Figure 1:
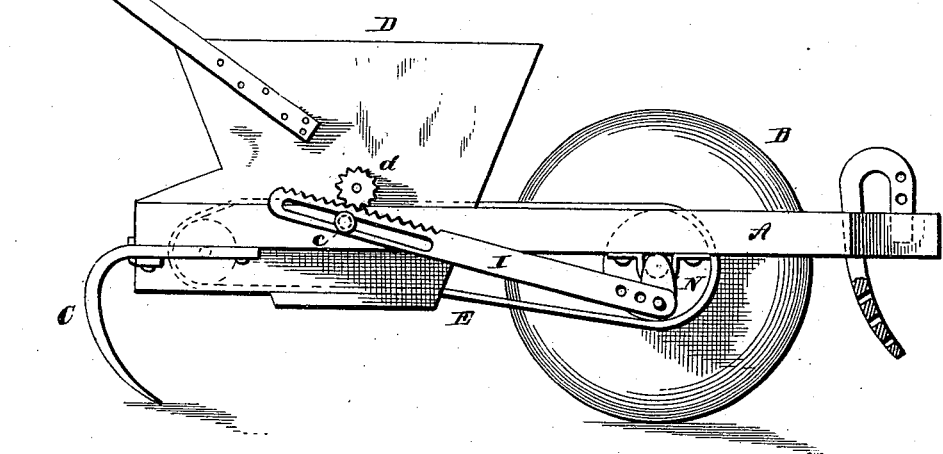
Figure 2:
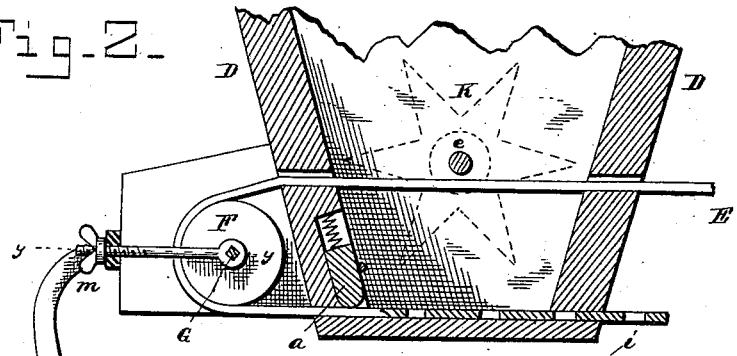

In the accompanying drawings, which make a part of this specification, Figure 1 represents a side view; Fig. 2, a cross-section; and Fig. 3, a plan, partly in section, of the rear portion of the frame of the machine.

In the figures, A represents the frame, which is made rectangular in shape, its forward end being carried by a wheel, B, and its rear supported by two curved arms, C C, the lower ends of which may be either formed into blades, or so constructed as to carry such blades or shovels as are ordinarily used with this class of machines.

D represents the seed-hopper, which is secured upon the rear end of the frame. The wheel B is located between the two sides of the frame and secured to a shaft which has its bearings in said frame. Upon the shaft of this wheel is a pulley, N. At the rear end of the frame is located a shaft, G, with its ends resting in longitudinal slots in said frame. Upon this shaft is a band-pulley, F.

E represents an endless belt, which passes through the hopper D and around each of the pulleys N and F, being driven by the pulley N. This belt E is provided at suitable intervals with seed-openings *i*. The lower portion of the belt plays upon the bottom of the hopper, and when seed is taken into its openings the openings, with their contents, pass, when the belt is in motion, under the cut-off *a*. This cut-off is actuated toward the belt by means of a suitable spring, and, resting upon it, prevents any more seed from passing out of the hopper than are actually contained in the seed-apertures.

Figure 3:
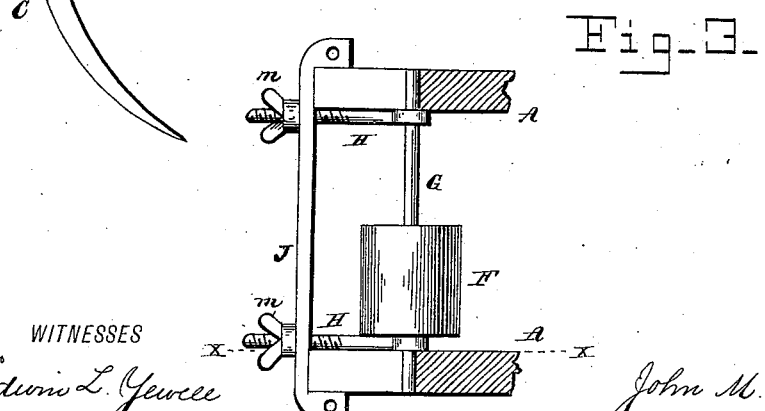

J represents a bar secured to and across the frame at its rear end. H H represent two eye-bolts which pass through this bar. The shaft G passes through the eyes of these bolts, as seen in Fig. 3, and is prevented from rotating by the said eyes, and the portion of the said shaft passing therethrough being square, as shown in Fig. 2. Set-screws *m m* upon the ends of the bolts serve to draw the shaft G backward or ease it forward in the slots in the frame, thus moving the pulley F, rotating on the said shaft, for the purpose of regulating the tension of the seeding-belt E. The pulley rotating on the shaft gives a larger bearing-surface than if the shaft rotated in the bolts, thus reducing the wear. Within the hopper is a toothed stirring or agitating wheel, K, secured upon a shaft, *e*, upon the outer end of which is secured a pinion, *d*.

I represents a slotted and toothed pitman. One end of this pitman is connected to a crank-arm on the shaft of wheel B. The other end is slotted, and a headed bolt passing through the slot, and upon which is mounted a friction-roller, confines it adjustably to the frame A. This end is also provided with teeth which intermesh with the teeth of the pinion, and thus when the machine moves a partial rotary motion is imparted to the stirring-wheel K through the pitman I.

The operation of this machine will be fully understood from the foregoing description of its several parts and their functions.

Having thus fully described my invention, what I claim as new, and desire to secure by Letters Patent, is—

In combination with the driving-wheel of the machine and its crank, a slotted and toothed pitman adapted to engage a pinion upon the shaft of the stirrer to partially rotate the same backward and forward in the seed-hopper, as and for the purpose specified.

In testimony whereof I affix my signature in presence of two witnesses.

JOHN M. LOWREY.

Witnesses:
 JOSEPH D. FRYE,
 PHILIP BRADLEY.